Oct. 10, 1961  A. J. HAMMOND  3,003,800
AUTOMOTIVE HOOD SAFETY LATCH
Filed Sept. 13, 1960  2 Sheets-Sheet 1

INVENTOR.
Almerion J. Hammond
BY
J. L. Carpenter
ATTORNEY

Oct. 10, 1961  A. J. HAMMOND  3,003,800
AUTOMOTIVE HOOD SAFETY LATCH
Filed Sept. 13, 1960  2 Sheets-Sheet 2

INVENTOR.
Almerion J. Hammond
BY
J. L. Carpenter
ATTORNEY 3,003,800
AUTOMOTIVE HOOD SAFETY LATCH
Almerion J. Hammond, Gladwin, Mich., assignor to General Motors Corporation, Detroit, Mich., a corporation of Delaware
Filed Sept. 13, 1960, Ser. No. 55,778
7 Claims. (Cl. 292—11)

This invention relates generally to improvements in hood latch assemblies and particularly those for automotive vehicles. It is well known that "pop-up" springs are generally employed between the hood and lower body construction of most automotive vehicles to cause the hood to raise a limited distance when the hood latch is unlatched. It is also well known that for safety reasons most hood latch assemblies include two latches, one of which is a primary latch, and the other, a safety latch which is provided to prevent the hood from flying upwardly in the event the primary latch fails or is not properly latched. The principal object of this invention is to utilize the pop-up springs to bias one of such latches to a latch engaging position. A second object of the invention is to use the pop-up spring as the biasing means for the safety latch of such hood latch assemblies.

For a further understanding of this invention, the above and other objects thereof, reference may be made to the following detailed description taken in conjunction with the drawings in which:

FIGURE 1 also shows the latch forming the subject of the invention in the latch engaging position.

Figure 1:
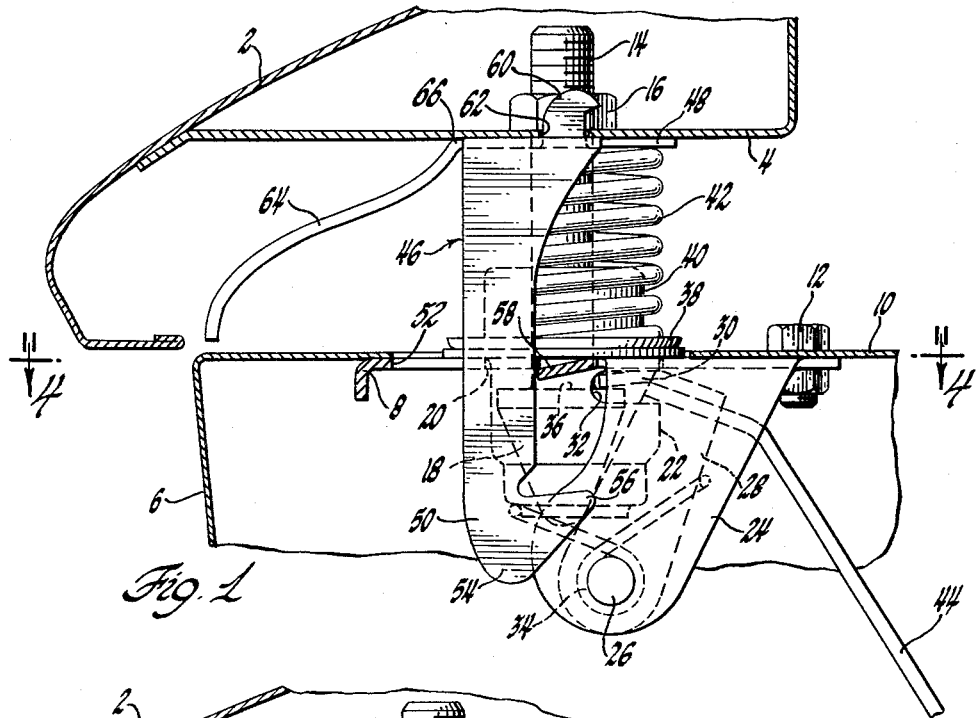
FIGURE 1 is a side elevation view of the hood latch assembly in its environmental construction with certain portions of the latter broken away.

In the figures, an automotive hood which is indicated by the numeral 2 includes upper supporting plate 4. Plate 4 is a vertically spaced from the lower body construction 6 of the vehicle which includes the sheet metal construction 10 to which is fastened by studs 12 a lower supporting plate 8. The upper plate 4 has fastened thereto by a vertically extending threaded shank 14 and nut 16 a pilot and keeper 18 which is adapted to penetrate an aperture 20 in supporting plate 8 and a guide portion 22 depending therefrom. Plate 8 is provided with downwardly depending ears or legs 24 whose lower ends act as support means for a pin 26 pivotally supporting a stirrup latch 28 having a latch element 30 fixed to the stirrup end thereof. Element 30 is biased through an aperture 32 provided in guide means 22 by a torsion spring 34. Element 30 as shown in FIGURE 1 when in the latch engaging position extends through the aperture 32 and engages a shoulder 36 on the keeper 18 to thus hold the hood 2 in its closed position relative to the body construction 6. Resting on the supporting plate 8 is a spring seat 38 having guide means 40 extending upwardly therefrom which receives the lower end of a helical coil spring 42. Spring 42 has its upper end acting against the plate 4 so that when latch 28 is released by its operating handle 44, hood 2 will move upwardly relative to the body construction 6 under the influence thereof.

Figure 2:
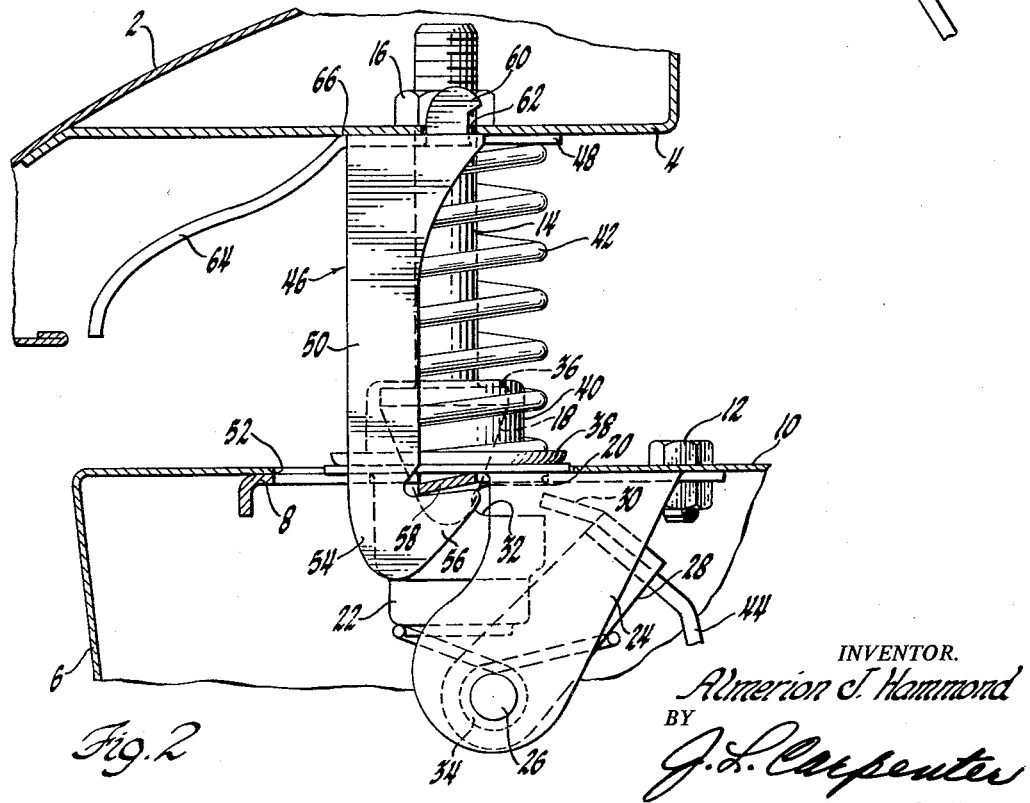
FIGURE 2 is a view similar to FIGURE 1 except that the primary latch is shown released and the safety latch is shown in the latch engaging position.
Figure 3:
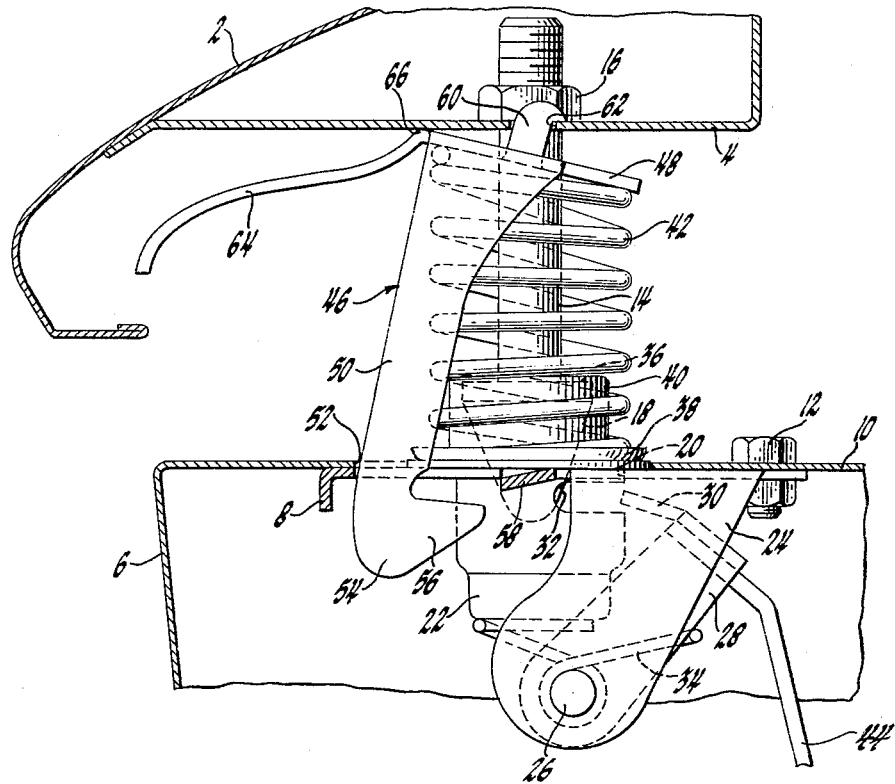
FIGURE 3 is a view similar to FIGURES 1 and 2 except that the safety latch is shown operated to a release position.
Figure 4:
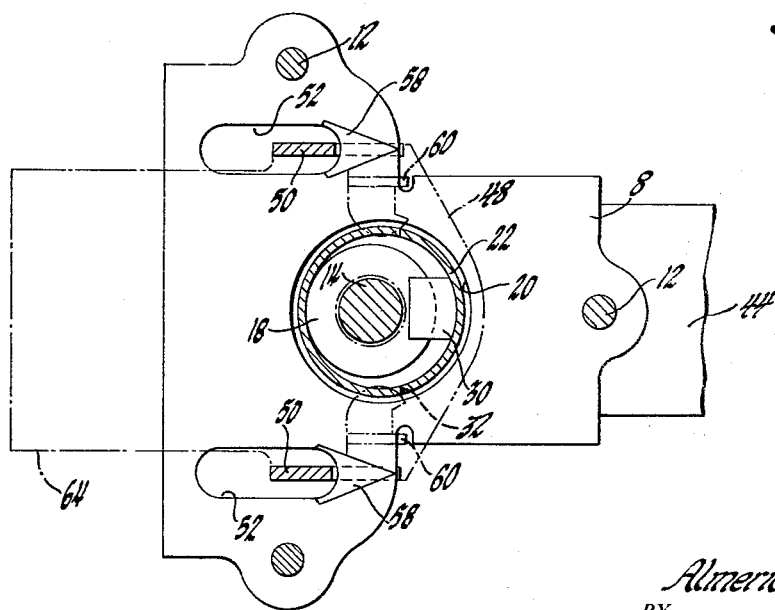
FIGURE 4 is a view taken generally on the line 4—4 of FIGURE 1 showing further details of the supporting plate through which the safety latch extends and also the keeper of the primary latch.

The safety latch which forms the primary subject of this invention will now be described. The latch itself is indicated generally by numeral 46 and comprises an upper flat plate-like portion 48 which forms an upper spring seat for spring 42 and is held against plate 4 thereby. Depending from opposite sides of plate 48 are a pair of latch fingers 50 whose lower ends are adapted to penetrate openings 52 provided in supporting plate 8. The lower ends 54 of fingers 50 have generally horizontally extending hook-like appendages 56 which in the portion shown in FIGURES 1 and 2 are adapted to catch on associated keeper flanges 58 which in part define apertures 52 through which the fingers 50 extend. The upper flat plate-like portion 48, it will be noted, is provided with a pair of oppositely disposed smaller hook-like members 60 which extend upwardly through openings 62 in plate 4 to thereby pivotally fasten the safety latch 46 to the hood structure 2 and limit any substantially horizontal movement with respect thereto. The plate-like portion 48 is also provided with an operating handle 64 which becomes accessible for operation after the hood 2 has been raised under the influence of spring 42 upon release of the principal latch 28 by its operating handle 44.

The operation of the latch 46 is as follows: After the hood 2 has moved to the position shown in FIGURE 2, upon unlatching of the principal latch 28, the operator may now insert his fingers between the hood 2 and the body construction 6 to operate the handle 64. Generally upward movement of handle 64 causes the safety latch 46 to pivot about the point of engagement 66 between plate portion 48 and supporting plate 4. Such pivotal movement will cause the hook-like appendages 56 to move from beneath the keeper flanges 58 so that the fingers 50 may move upwardly out of the openings 52 and the hood 2 may be raised to its fully opened position.

From the foregoing description, it will be appreciated that the pop-up springs normally present in assemblies of this kind not only serve their usual function, but act as the biasing means for the safety latch as well. It will also be noted that the safety latch 46 may be quickly and easily made out of a stamped flat sheet. Thus, by the construction shown, fewer parts are required in the present construction to provide a properly functioning safety latch than in conventional type hood latches which include safety latch means.

I claim:
1. A safety latch for use between the associated hood and body parts of an automotive vehicle comprising a base member having an operating handle thereon and a hook extending therefrom, a latch plate engageable by said hook adapted to be mounted on one of the parts and a pop-up spring engaging said base member and insertable between the hood and body parts tending to separate them and at the same time adapted to yieldably clamp said base member against the other of the parts so that it may be moved out of engagement with said latch plate by said handle against the action of said spring.

2. A safety latch for use between the associated hood and body parts of an automotive vehicle comprising vertically spaced upper and lower horizontal plate members adapted to be supported by the parts, a latching member which includes a generally horizontally extending base, a hook depending from said base engageable with the lower of said plate members, a spring extending between said upper and lower plate members and yieldably holding said base against the upper of said horizontal plate members, said spring tending to maintain said hook in engagement with the lower of said plate members and tending to separate said upper and lower plate members and means to move said hook against the bias of said spring out of engagement with said lower plate member.

3. In a latch assembly for automobiles and the like, a supporting plate having a keeper receiving aperture adapted to receive a keeper penetrating the aperture in a path generally perpendicular to the plate, a support depending from said supporting plate and extending generally perpendicular thereto, a latch mounting pin journaled on said support about an axis lying in a plane generally parallel with the general plane of the plate and spaced therefrom, a latch element rotatably mounted on said pin and having an upper portion adapted to engage the keeper, a keeper guide surrounding said aperture and extending downwardly therefrom, an opening in said keeper guide, the upper portion of the latch element adapted when moved to keeper engaging position to move through the opening in said keeper guiding portion, resilient means for normally urging said latch element to keeper engaging position, means for rotating said latch element away from keeper engaging position, a second supporting plate vertically spaced from said first mentioned supporting plate, a second latching assembly including a base member having a downwardly depending latch finger penetrating a second opening in said supporting plate, a spring surrounding said keeper and engaging said base member and yieldably holding said base member against said second supporting plate and means for moving said latch finger in opposition to the bias of said spring from latch engaging position.

4. In a latch assembly for automobiles and the like, a first supporting plate having an aperture defined in part by a keeper flange adapted to receive a latch penetrating the aperture, a second plate spaced from said supporting plate, a latch extending in the directions of said plates adapted to penetrate said aperture and latch with said flange, a spring extending between said plates having one end seated against said first plate and holding one end of said latch against said second plate and tending to separate said plates, and means on said latch operable to move said latch against the bias of said spring out of latching engagement with said flange.

5. The construction of claim 4 in which the end of said latch biased against said second plate is provided with means movably securing said latter end to said second plate.

6. The construction of claim 5 in which said latter means comprises a hook on the latter end of said latch extending through an opening provided in said second plate.

7. In a latch assembly for automobiles and the like, a supporting plate having an aperture defined in part by a keeper flange adapted to receive a latch penetrating the aperture in a path generally perpendicular to the plate, a second plate vertically spaced form said supporting plate, a generally vertically extending latch adapted to penetrate said aperture and latch with said flange, a spring extending between said plates and holding one end of said latch against said second plate and tending to separate said plates, and means on said latch operable to move said latch against the bias of said spring out of the path of said flange.

References Cited in the file of this patent

UNITED STATES PATENTS

| | | |
|---|---|---|
| 2,269,537 | Krause | Jan. 13, 1942 |
| 2,523,814 | Claud-Mantle | Sept. 26, 1950 |
| 2,912,272 | Wade | Nov. 10, 1959 |